June 17, 1958 W. CULL 2,838,919
TORQUE TRANSMITTING UNIVERSAL JOINTS

Filed April 2, 1956 2 Sheets-Sheet 1

Inventor
W. Cull
By ...
Attys.

June 17, 1958   W. CULL   2,838,919
TORQUE TRANSMITTING UNIVERSAL JOINTS
Filed April 2, 1956   2 Sheets-Sheet 2

Inventor
W. Cull

United States Patent Office 2,838,919
Patented June 17, 1958

2,838,919

TORQUE TRANSMITTING UNIVERSAL JOINTS

William Cull, Shipley, England, assignor to Unipower Rzeppa Limited, Shipley, England Application April 2, 1956, Serial No. 575,652

Claims priority, application Great Britain April 7, 1955

7 Claims. (Cl. 64—21)

This invention relates to torque transmitting universal joints of the constant velocity ratio type in which the torque is transmitted through a series of balls engaged in meridian race grooves in a spherical or partly spherical inner member on one of the drive elements and in a hollow spherical or partly spherical outer member on the other drive element of the joint, and in which a cage for locating the balls is positioned between the two members.

In joints of the above type it is essential that the contacts of the balls with their race tracks should under all conditions lie in a critical plane containing the nodal point of the joint and also bisecting the angle between the drive elements or shafts. In previously known joints of the type referred to this requirement has been met by the provision of means for controlling the position of the ball cage in accordance with the variable angle of the drive elements or shafts. In a well known form of joint the required control is effected by a pin or lever guided in one of the drive elements and having a spherical seating in the end of the other drive element, the said pin or lever having at an intermediate point in its length a spherical seating engagement with a continuation of the ball cage for positioning the latter in accordance with the angle between the driving elements. It has also been proposed to provide a joint of the type referred to in which the balltracks are grooves of the same radius as the ball and the longitudinal curvatures of the inner and outer race grooves are respectively concentric with spaced points lying on the axis of the joint shaft.

It is an object of the present invention to provide an improved joint of the type referred to in which the required positioning of the plane containing the balls is effected in a satisfactory manner without the necessity of providing controlling or pilot devices for the ball cage.

The invention comprises a joint of the type referred to having meridian race grooves of a cross section such as to provide localized contact areas with the balls lying in a path inward of the meridian race groove margins to afford a suitable pressure angle, the roots of the said grooves lying out of ball contact or being absent, in which the shaping of the grooves is such that the mating pitch paths or the track contact lines of the inner and outer tracks are crossed, when the drive elements of the joint are aligned, at an angle which is greater than the angle of friction for the balls and tracks to provide a force derived from the transmission torque for positioning the balls in the required relation to the angle between the drive elements or shafts.

The invention also comprises a joint as defined in the preceding paragraph in which the mating tracks of the inner and outer grooves are respectively formed from two centres symmetrically located at equal distances from the joint centre and so displaced that the contact lines of the balls with the mating tracks lie on the projected surface of a cone the apex angle of which is twice that of the pressure angle selected, and the loci of the tracks, being on the base circle of the said cone.

In one possible arrangement according to the invention the form of the race grooves is such that the two mating track contact lines are crossed at an angle of something greater than 11° when the drive elements or shafts are aligned.

The cross sectional form of the race grooves may conveniently be such that when a ball of correct size is fitted into the mating tracks the contact line passing through the tracks and the ball makes a pressure angle of 45° with the normal, but this pressure angle may be varied as desired to suit particular conditions. The term pressure angle may be conveniently defined as the angle between the line of pressure through the ball and tracks and a line passing through the centre of the ball and being radial to the ball pitch circle when this is projected into the critical plane which contains the intersection of the axes of the drive elements or shafts (i. e. the nodal point of the joint) and also bisecting the angle between the said axes.

The cross section of the race grooves may take various forms to afford the required contact between the balls and the tracks on which they run. Thus for example these tracks may comprise flat portions which are normal to the pressure line and extend a sufficient distance on both sides thereof. It is generally preferred however to provide tracks which are arcuate in cross section, the radius of curvature being greater than that of the ball but otherwise of any desired curvature. Thus the arcs may be circular arcs if desired, but in practice it is generally preferred to employ tracks which in cross section are parts of an ellipse, and in a convenient form of construction the grooves are of half elliptical form in cross section with the major axis of the ellipse disposed radially of the joint. The ratio of conformity of the race tracks to the ball radius may conveniently be of the order of 1.02. With such an arrangement the contact areas of the balls on the flank tracks take the form of small ellipses and the path of these contacts always lies inwardly of the margins of the race grooves.

In the accompanying drawings.

Figures 1, 2:
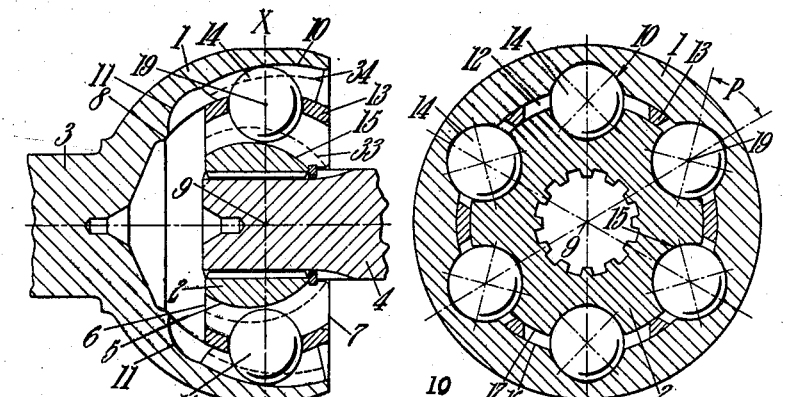
Figure 1 is a longitudinal section of a universal joint constructed in accordance with the invention.
Figure 2 is a cross section of the joint on the line X—X of Figure 1.

In carrying the invention into effect according to one convenient mode as shown in Figures 1 and 2, there is provided a constant velocity ratio type torque transmitting joint comprising inner and outer race members 1 and 2 formed on or attached respectively to shafts 3 and 4. The inner member 2 has a partly spherical surface 5, and end faces 6 and 7 perpendicular to its shaft axis. The outer member 1 is hollow and has an internal surface 8 of partly spherical form centered at the nodal point 9 containing the outer meridian ball race grooves 10 and is integral with its shaft 3. The intersection 9 of the two shaft axes is the centre or nodal point of the joint. The outer member race grooves 10 preferably terminate towards one end in clearance pockets 11 which facilitate groove grinding and also assist in the assembly of the balls in the grooves. In a clearance 12 between the spherical surfaces of the inner and outer members of the joint a cage 13 is located having slots or apertures for the reception and location of torque transmitting balls 14 which on one side engage the inner race grooves 15 and on the other side the outer race grooves 10. The cage has partly spherical external and internal surfaces concentric to each other which coact with an annular surface 16 of partly spherical form on the outer member 1 and a partly spherical surface 17 on the inner member 2, the spherical centre of the cage being the centre or nodal point 9 of the joint.

Figure 3:
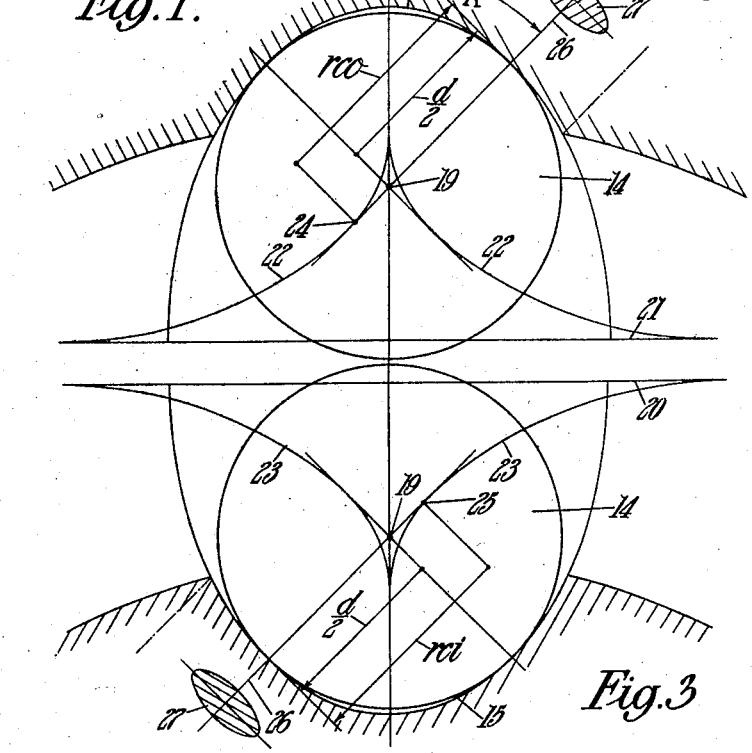
Figure 3 is a diagrammatic end view of the inner and outer race grooves with balls therein, showing the geometry of the track ellipses, conformity, and contact.

The cross sections of the meridian race grooves are cut or ground to somewhat less than half an ellipse with its common major axis lying radially of the joint. This is seen in Figure 3 where the outer track 10 and the inner track 15 are shown radially separated for greater clarity. The common major axis is shown at 18, the ball centre being at 19. The minor axis 20 for the inner groove 15 lies above the ball centre while the minor axis 21 for the outer groove 10 lies below such centre. The evolute of the outer track ellipse is shown at 22 and the evolute of the inner track ellipse is shown at 23. A suitable pressure angle ($P_a$ in the figures) for the balls is predetermined and in the present example this angle is to be assumed as 45°. The major arcs of the ellipse, at the point of the contact with the ball, are struck from centres 24 and 25 respectively (Figure 3) lying on the 45° pressure line 26, at a point where the pressure line is tangent to the evolute of the ellipse. The radius of the arc ($r\ c\ o$ or $r\ c\ i$) is greater than the radius ($d/2$) of the ball by the desired conformity. The formation of these cross-sectional grooves is such that the major arcs constitute flanking tracks within which the ball contacts lie, while the minor arcs of the ellipse are disposed at the roots of the race grooves and are out of contact with the balls. In some constructions these root portions of the grooves may be omitted. The ratio of conformity of the race tracks to the ball radius may conveniently be 1.02, i. e. at the point of contact the radius of the track is 1.02 times the ball radius. This figure may be varied in practice to maintain the condition that the small contact areas of the balls do not approach too near to or overlap the margins of the race grooves. The balls and grooves are proportioned so that a small clearance exists on the sides away from the ball contacts when the joint is under torque. The contact areas of the balls on the flanks of the tracks when under pressure take the form of small ellipses 27 (shown exaggerated in Figure 3) and the path of these contacts always lies inwardly of the margins of the race grooves so that the pressure developed does not operate to displace the material at the groove edges. Instead of being elliptical the tracks may have other forms, e. g. including portions flat in cross section, to provide small ball contact areas disposed as described above.

In order to provide a controlling or steering force on the balls and ball cage which will position them accurately with respect to the angle between the shafts when the latter are either aligned or inclined at a small angle, it is necessary that the mating pitch paths or the track contact lines of the inner and outer tracks should be crossed, when the shafts are in alignment, at an angle which is greater than the angle of friction of the balls and tracks. The angle of friction is determined by experience, being dependent upon the nature of the materials of the balls and track. It will be assumed for the purpose of this example that the angle of friction is 5° in which case the required steering force to position the balls will be provided when the angle of crossing of the pitch paths (or convergence) is 11°28'. In order to fulfil the conditions of mating pitch path crossing referred to above it is necessary to determine particular centres from which the mating tracks of the inner and outer grooves are respectively formed, and this may be conveniently explained graphically in the following manner with reference to Figures 4, 5 and 6. Having determined a suitable pressure angle, e. g. 45°, a cone 28 is drawn with the centre 19 of the ball as its apex and with an apex angle of twice the pressure angle, the base 29 ($a\ c$) of the cone being horizontal and having midway thereof the centre or nodal point 9 of the joint. This cone 28 will be referred to as the pressure angle cone. The cone is then projected in the direction of the arrow E at an angle equal to the pressure angle, i. e. 45°, so that its base appears as an ellipse 30 passing through the centre of the ball, the centre or nodal point 9 of the joint appearing centrally in the ellipse 30. To obtain the required control or steering of the balls their contacts with the inner and outer tracks must lie on inclined straight lines 31 and 32 passing through the ball centre as viewed in the diagram projected as above. Also the controlling force on the ball and cage assembly must always be greater than the load passing through the ball centre multiplied by the coefficient of friction. If the angle of friction is 5° as previously assumed the angle 5°44' will be the angle $\omega$ which is half the required angle (covergence angle) between the inclined lines referred to above passing through the two track contact points of the ball which intersect the projected cone base circle 30 at two points shown at $a_i$ and $a_o$. It is then necessary for generation of the tracks to determine the polar co-ordinate of points $a_i$ and $a_o$ in the plane containing the base circle of the pressure angle cone and a plane normal thereto containing the centre of the joint and ball. A convenient method is to determine an auxiliary angle $\Omega$ through which the locus of the pitch path must revolve around the base circle of the pressure angle cone as follows:

$$\operatorname{Sin} \Omega = \frac{Kd \operatorname{Sec} P_A \operatorname{Sin} \omega}{Kd \operatorname{Tan} P_A}$$

If it is assumed that the pressure angle $P=45°$; $d=1$; $K=1.65$; and $\Omega=5°44'$, this gives the auxiliary angle $\Omega$ as 8°7'. In this way the offset of the tracks and consequently the two points $a_i$ and $a_o$ on the base circle can be determined as shown in Figure 4, these being the generating loci of the inner and outer tracks to give the required track convergence.

Figures 4, 5, 6:
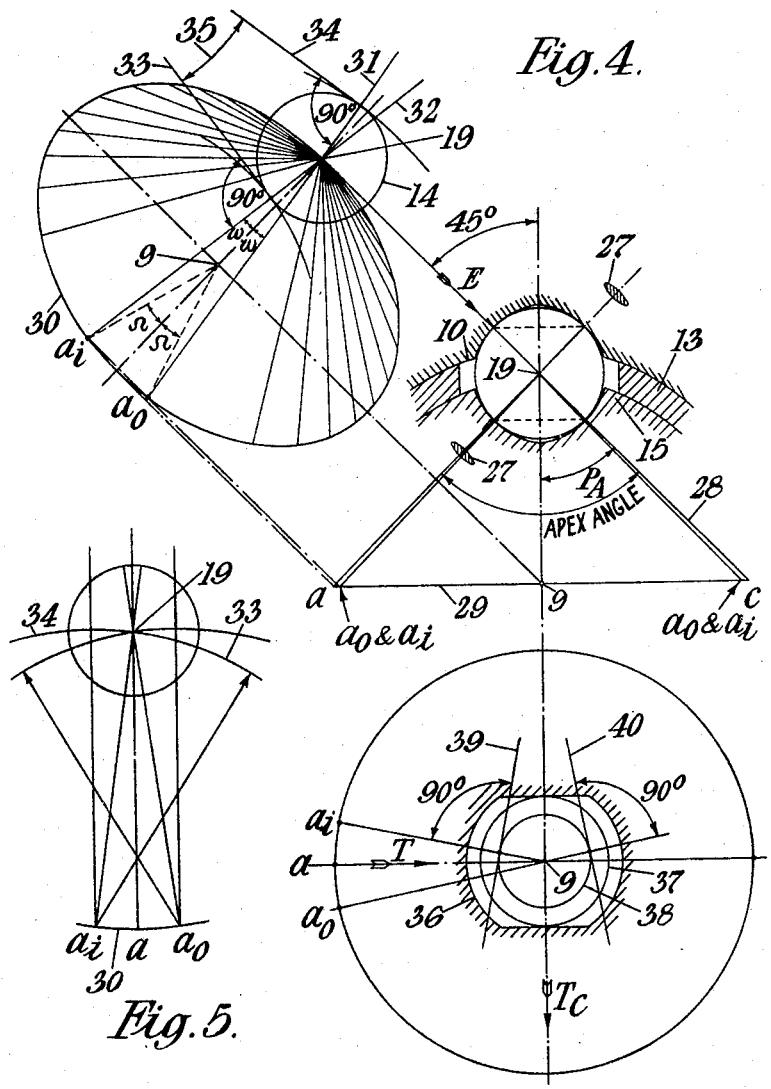
Figures 4, 5 and 6 are diagrams showing the manner in which the centres from which the mating cracks of the inner and outer race grooves are formed.

Referring to Figure 5, a part of the base circle is shown at 30 with the points $a_i$ and $a_o$ thereon from which the respective pitch paths 33 and 34 of the inner and outer tracks are struck, these paths crossing as shown. The true track convergence angle, which is $2\omega$, is indicated at 35 in Figure 4.

Figure 6 is a plan view of the pressure angle cone of Figure 4 and shows a cage window 36 in which the ball is located. The diameter of the ball is indicated at 37 and the ball contact circle at 38. The inner track flank is indicated at 39, and the outer track flank at 40. It is to be noted that due to the track convergence, a driving torque in the direction of the arrow T will produce a component of force $Tc$ on the cage and will thus positively steer the balls and cage into the correct position, which is one which bisects the angle between the shafts of the joint.

It will be seen from the foregoing that the distance between the generating loci $a_i$ and $a_o$ and the ball centre are equal at all shaft angles and that arcs (33, 34) struck from these centres through the ball centre will represent the pitch paths of the inner and outer tracks respectively and will be crossed at the required angle as previously defined. It will be understood that the figures given above are by way of example only and may be varied according to circumstances. However, the crossing convergence angle $2\omega$ of the mating track contact lines should not greatly exceed that necessary to afford the desired controlling force on the balls and cage when the shafts are aligned. Experience leads to a limiting value of 2.4 times the angle of friction, bearing in mind the fact that the controlling force increases with increase of shaft angularity, and that at shaft inclinations greater than about 11° an additional controlling force is not theoretically required.

By this invention there is provided a constant velocity torque transmitting joint in which the ball and cage assembly is positively controlled or steered by a force derived from the torque into the required angle at all times, and particularly when the shafts are aligned or inclined at a small angle. Also by the use of ball race grooves of the cross sectional formation described the contact area of the ball with its tracks can be controlled and by suitable design the mean pressure in the ball contact area can be adjusted to any desired value. Whilst the pressure angle of the balls and tracks can be varied, a further advantage is obtained by employing a pressure angle in the neighbourhood of 45° in that the inner ball race is self-centering within limits, so that the load is distributed equally between the balls. In a convenient arrangement six balls are provided. It will also be appreciated that the ratio between rolling and sliding of the balls can be determined by the selection of the pressure angle.

I claim:

1. A torque transmitting universal joint of the type referred to comprising an at least partly spherical inner member, an at least partly spherical hollow outer member, meridian race grooves in both said members, a series of drive transmitting balls engaged in said race grooves, and a spherically concentric cage for locating the balls positioned between said members, the cross section of each of said race grooves having a curvature other than that of the balls such as to provide localized elliptical contact areas with the balls and without contact between the balls and the roots of said grooves, the whole of each of said elliptical contact areas lying in a path inwards of the race groove margins and disposed so as to afford a predetermined pressure angle of operation and a track convergence angle of 2ω in the plane of the pressure angle, the contact areas between ball and race groove lying out of the critical plane containing the intersection of the driving axes of the members but on the same side of said plane by an amount equal to d/2 sine ω where d is the diameter of the ball, and spaced apart around the ball in the plane of the pressure angle by an angle of 180°—2ω, said pressure angle being the angle between the line of pressure passing through the centre of the ball and the centre of a track contact ellipse and a line passing through the centre of the ball and radial to the ball pitch circle when the latter is projected into the aforesaid critical plane containing the intersection of the axes of the inner and outer members and also bisecting the angle between said axes, the cross section of said meridian race grooves being constant but of varying depth arranged so as to cause the meridian pitch circles of the inner and outer race tracks to cross each other in the pressure angle plane where it contains the aforesaid critical plane at an included angle of 2ω when the axes of the inner and outer members are aligned, the angle ω being greater than the angle of friction for the balls and tracks, and the transmission torque by reason of said track convergence in the pressure angle plane has a component of force at right angles to an orbital plane passing through each ball centre and bisecting the angle of convergence of the mating tracks, which forces balance only when the ball centres are contained in the critical plane bisecting the angles between the driving axes of the members, whereby the cage and ball system of the joint is at all times held in the correct geometrical relationship with the driving axes of the members.

2. A joint according to claim 1, in which the mating tracks of the inner and outer race grooves are respectively formed from two centres symmetrically located at equal distances from the joint centre and so disposed that the contact lines of the balls with the mating tracks lie on the projected surface of a cone the apex angle of which is twice the pressure angle, and the loci of the tracks are on the base circle of said cone.

3. A joint according to claim 1, in which the mating track contact lines are crossed at an angle greater than 11° when the driving axes of the members are aligned.

4. A joint according to claim 1, in which the cross sectional form of the race grooves is such that the ball contact line passing through the tracks and the ball makes a pressure angle of 45° with the normal.

5. A joint according to claim 1, in which the race grooves have a cross section of arcuate form the radius of curvature of which is greater than that of the ball.

6. A joint according to claim 1, in which the race grooves have a cross section comprising parts of an ellipse, the major axis of the ellipse being disposed radially of the joint.

7. A joint according to claim 1, in which the ratio of conformity of the radius of the race grooves to the ball radius is of the order of 1.02.

References Cited in the file of this patent

UNITED STATES PATENTS

| | | |
|---|---|---|
| 1,975,758 | Stuber | Oct. 2, 1934 |
| 2,046,584 | Rzeppa | July 7, 1936 |
| 2,322,570 | Dodge | June 22, 1943 |
| 2,325,460 | Amberg | July 27, 1943 |

UNITED STATES PATENT OFFICE

CERTIFICATE OF CORRECTION

Patent No. 2,838,919 June 17, 1958

William Cull

It is hereby certified that error appears in the above numbered patent requiring correction and that the said Letters Patent should read as corrected below.

In the grant, lines 1 and 2, for "assignor to Unipower Rzeppa Limited" read -- assignor of one-half to Unipower Rzeppa Limited --; line 11, for "Unipower Rzeppa Limited, its successors" read -- William Cull, his heirs or assigns, and Unipower Rzeppa Limited, its successors --; in the heading to the printed specification, lines 3 and 4, for "assignor to Unipower Rzeppa Limited," read -- assignor of one-half to Unipower Rzeppa Limited, --.

Signed and sealed this 4th day of November 1958.

(SEAL)
Attest:

KARL H. AXLINE
Attesting Officer

ROBERT C. WATSON
Commissioner of Patents